(No Model.)
H. CARMICHAEL.
METHOD OF AND APPARATUS FOR CHARGING LIQUIDS WITH GAS.
No. 604,018. Patented May 17, 1898.
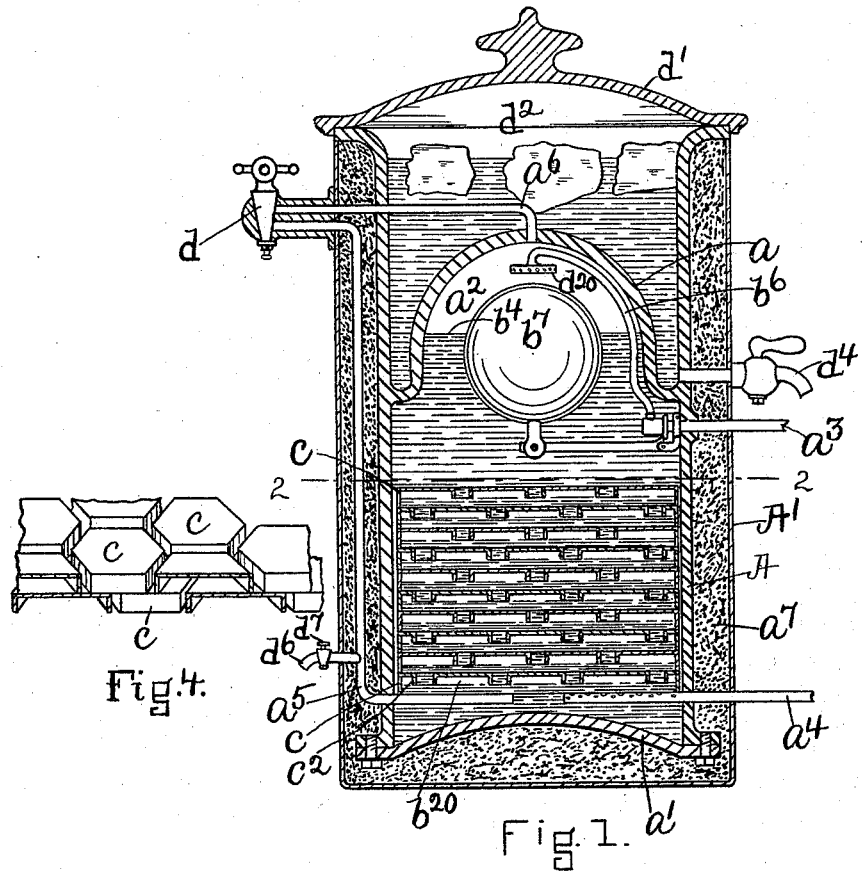
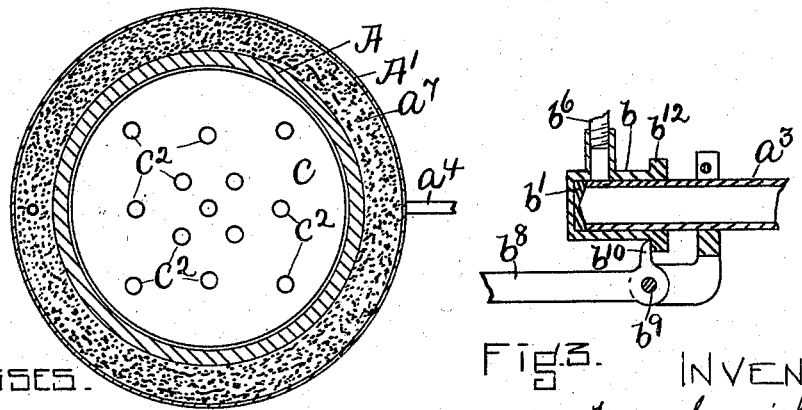
WITNESSES.
Matthew M. Blunt
J. Murphy
INVENTOR
Henry Carmichael
by Jas. H. Churchill
ATT'Y.

UNITED STATES PATENT OFFICE.

HENRY CARMICHAEL, OF MALDEN, MASSACHUSETTS.

METHOD OF AND APPARATUS FOR CHARGING LIQUIDS WITH GAS.

SPECIFICATION forming part of Letters Patent No. 604,018, dated May 17, 1898.

Application filed June 16, 1897. Serial No. 640,988. (No model.)

*To all whom it may concern:*

Be it known that I, HENRY CARMICHAEL, residing in Malden, in the county of Middlesex and State of Massachusetts, have invented an Improvement in Methods of and Apparatus for Charging Liquids with Gas, of which the following description, in connection with the accompanying drawings, is a specification, like letters on the drawings representing like parts.

This invention relates to a novel method and apparatus for charging liquids with gas, and is especially applicable for charging water with carbonic-acid gas.

The particular features of this invention will be pointed out in the claim at the end of this specification.

Figure 1 represents in vertical section one form of apparatus embodying this invention; Fig. 2, a section on the line 2 2, Fig. 1; Fig. 3, a detail to be referred to, and Fig. 4 a modification to be referred to.

In the present instance I have illustrated my invention as embodied in what may be termed a "portable" apparatus and which, as herein shown, consists of a shell or casing A, preferably of cylindrical form and provided with a dome-shaped partition-wall $a$ and with a removable bottom $a'$, forming a charging-chamber $a^2$, which is provided near its upper end with a water-inlet pipe $a^3$ and at its lower end with a gas-inlet pipe $a^4$. The charging-chamber $a^2$ is also provided with an outlet-pipe $a^5$ for the charged water and preferably with a gas-outlet pipe $a^6$. The shell or casing A may and preferably will be placed within an outer shell or casing A', and the space between the two shells may be filled with non-heat-conducting material $a^7$. The water-inlet pipe $a^3$ is connected to a source of supply containing water under pressure—such, for instance, as the street-main—and the said inlet-pipe may and preferably will be provided with an automatically-operated shut-off valve, which may be of any suitable construction and which is herein shown as a cylinder $b$, closed at one end and fitted over the end of the inlet-pipe $a^3$, (see Fig. 3,) the said cylinder containing a washer $b'$, which is adapted to be forced liquid-tight against the normally open end or mouth of the inlet-pipe $a^3$ when the water $b^4$ to be charged and admitted into the chamber $a^2$ through a pipe $b^6$, connected to the cylinder $b$, has reached a predetermined level, the said water, as herein represented, acting on a float $b^7$ to turn a lever $b^8$ on its pivot $b^9$, and by means of a finger or arm $b^{10}$ on said lever in engagement with a flange $b^{12}$ on the cylinder move the said cylinder so as to close the outlet-pipe and shut off the supply of water.

Instead of the particular automatic shut-off herein shown I may use any other suitable or desired construction.

In accordance with this invention the water in the chamber $a^2$ is charged with gas admitted into said chamber through the pipe $a^4$ by causing the said gas to be arrested in its ascent, so as to form, preferably, a series of layers $b^{20}$ within the body of water. This result may and preferably will be effected by providing the charging-chamber $a^2$ with a series of superimposed pockets or traps, which may be formed by means of inverted saucers, dishes, or pans, herein represented as of substantially the same size or diameter as the chamber $a^2$ and supported one above the other in any desired manner, but which may be of any desired size or shape. The pans or saucers $c$ are preferably provided with one or more passages $c^2$, formed in their bottom and having their walls extended into the pan or dish a sufficient distance to substantially form a water seal for the gas in the trap when the supply of gas is shut off, but which seal may be easily broken when the gas-supply pipe $a^4$ is open, the said pipe being provided with a suitable valve. (Not herein shown.)

By reference to Fig. 1 it will be seen that the layer of gas in each trap or pocket as well as the contiguous layer of water is quiet or in a static condition, and that even when the charged water is being drawn off and gas is being admitted the pockets or traps are kept full of gas, so that the charging-chamber $a^2$ contains a body of liquid within which is a series of layers of gas, and a substantially large surface or area of water is in direct contact with the layers of gas, which facilitates and insures the absorption of the gas by the water, whereby a substantially continuous supply of highly-charged water may be obtained from an apparatus embodying this invention.

The water-outlet pipe $a^5$ and the gas-outlet pipe $a^6$ may and preferably will be controlled by a valve $d$ of suitable construction to permit either to be drawn off from the chamber $a^2$.

The apparatus herein shown is provided with a removable cover $d'$, which forms with the wall $a$ an upper chamber $d^2$ for the reception of ice, which serves as a refrigerating-chamber surrounding the chamber $a^2$, so as to keep the water in the chamber $a^2$ cool and at substantially freezing temperature and thereby facilitate the absorption of the gas, and the chamber $b^2$ may be provided with a water-outlet pipe $d^4$. If desired, the outlet-pipe $a^5$ may have connected to it a branch pipe $d^6$, provided with a cock or valve $d^7$, which may be used for filling tanks or vessels with the charged water.

In order that the water at its entrance may be partially charged with gas and in order that a partial vacuum may be formed at the upper end of the chamber $a^2$, so that the inflowing gas may readily pass up through the body of water to supply the deficiency thereby created, the water-inlet pipe $b^6$ is extended to the upper part of the chamber above the water-level and is preferably provided with a distributer or sprayer $d^{20}$.

Prior to this invention I am aware that it has been proposed to charge water with carbonic-acid gas by cascading or spraying the water in the presence of the gas or by forcing the gas in minute bubbles through the water. In these methods the absorption is limited to the short time or period of motion of either the gas or water, whereas in the present case the period of absorption is indefinitely extended and the contact-surfaces may be made as large as desired. I prefer to have the water maintained at a constant level by means of a float in order to use the apparatus continuously without supervision; but I do not desire to limit my invention in this respect, as the chamber $a^2$ may be intermittently filled with water.

In industrial operations for the absorption of ammonia, hydrochloric acid, and the like I prefer the use of inverted polygonal plates or tiles with depending edges, which are piled up on one another in overlapping courses or horizontal layers. (See Fig. 4.) The chinks or spaces between the contiguous plates are left wide enough for the passage of the excess of gas upward until arrested by the plate-traps of the higher layers or until absorbed by the liquid.

I claim—

An apparatus for charging liquid with gas, which consists in a chamber provided with a liquid-inlet and with a liquid-outlet, a gas-inlet connected to the chamber near its bottom, a gas-outlet for the chamber near its upper end, and a single cock or valve controlling the gas and liquid outlets, substantially as described.

In testimony whereof I have signed my name to this specification in the presence of two subscribing witnesses.

HENRY CARMICHAEL.

Witnesses:
JAS. H. CHURCHILL,
J. MURPHY.